(12) United States Patent
Parvarandeh et al.

(10) Patent No.: US 11,984,160 B2
(45) Date of Patent: May 14, 2024

(54) PHYSICAL UNCLONABLE FUNCTIONS BASED ON A CIRCUIT INCLUDING RESISTIVE MEMORY ELEMENTS

(71) Applicant: GlobalFoundries U.S. Inc., Malta, NY (US)

(72) Inventors: Pirooz Parvarandeh, Los Altos Hills, CA (US); Periyapatna G. Venkatesh, Fremont, CA (US)

(73) Assignee: GlobalFoundries U.S. Inc., Malta, NY (US)

( * ) Notice: Subject to any disclaimer, the term of this patent is extended or adjusted under 35 U.S.C. 154(b) by 270 days.

(21) Appl. No.: 17/679,207

(22) Filed: Feb. 24, 2022

(65) Prior Publication Data
US 2023/0267998 A1 Aug. 24, 2023

(51) Int. Cl.
*G11C 11/00* (2006.01)
*G11C 13/00* (2006.01)
*H04L 9/32* (2006.01)

(52) U.S. Cl.
CPC ........ *G11C 13/0059* (2013.01); *G11C 13/004* (2013.01); *G11C 13/0069* (2013.01); *H04L 9/3278* (2013.01)

(58) Field of Classification Search
CPC .............. G11C 13/0059; G11C 13/004; G11C 13/0069
USPC ........................................................ 365/148
See application file for complete search history.

(56) References Cited

U.S. PATENT DOCUMENTS

| 9,916,884 | B2 | 3/2018 | Augustine et al. |
| 10,803,942 | B1 | 10/2020 | Jung et al. |
| 2011/0280073 | A1* | 11/2011 | Chiu ................. G11C 13/0004 365/185.08 |
| 2012/0307549 | A1* | 12/2012 | Shukh ................ G11C 14/0081 365/154 |

(Continued)

FOREIGN PATENT DOCUMENTS

| CN | 104900262 B | 1/2020 |
| TW | I550609 B | 9/2016 |
| TW | I713312 B | 12/2020 |

OTHER PUBLICATIONS

R. Govindaraj and S. Ghosh, "A strong arbiter PUF using resistive RAM within 1T-1R memory architecture," 2016 EEE 34th International Conference on Computer Design (ICCD), pp. 141-148, doi: 10.1109/ICCD.2016.7753272 (2016).

(Continued)

*Primary Examiner* — Vu A Le
(74) *Attorney, Agent, or Firm* — Thompson Hine LLP; David Cain

(57) ABSTRACT

Circuits that include resistive memory elements and methods of using such circuits to generate a physical unclonable function. The circuit includes a first resistive memory element, a second resistive memory element, a first transistor having a source/drain region connected to the first resistive memory element, and a second transistor having a source/drain region connected to the second resistive memory element. The circuit further includes a first inverter having an input connected to a first node between the first transistor and the first resistive memory element, and a second inverter having an input connected to a second node between the second transistor and the second resistive memory element.

20 Claims, 3 Drawing Sheets

(56) References Cited

U.S. PATENT DOCUMENTS

| | | | |
|---|---|---|---|
| 2012/0320658 A1* | 12/2012 | Wang | G11C 14/0054 365/148 |
| 2013/0135918 A1* | 5/2013 | Kushida | G11C 13/004 365/148 |
| 2017/0178710 A1 | 6/2017 | Augustine et al. | |
| 2017/0272258 A1 | 9/2017 | Tanamoto et al. | |
| 2017/0301406 A1 | 10/2017 | Wong et al. | |
| 2020/0227121 A1 | 7/2020 | Wein-Town et al. | |

OTHER PUBLICATIONS

L. Lu, Y. Z. Chen and T. T.-H. Kim, "A Configurable Randomness Enhanced RRAM PUF with Biased Current Sensing Scheme," 2021 IEEE International Symposium on Circuits and Systems (ISCAS), pp. 1-5, doi: 10.1109/ISCAS51556.2021.9401390 (2021).

Y. Yoshimoto et al., "A ReRAM-based physically unclonable function with bit error rate < 0.5% after 10 years at 125° C. for 40nm embedded application," 2016 IEEE Symposium on VLSI Technology, pp. 1-2, doi: 10.1109/VLSIT.2016.7573433 (2016).

Taiwan Intellectual Property Office, Office Action and Search Report issued in Taiwaneese Patent Application No. 112103114 on Jan. 18, 2024; 5 pages.

* cited by examiner

PHYSICAL UNCLONABLE FUNCTIONS BASED ON A CIRCUIT INCLUDING RESISTIVE MEMORY ELEMENTS

BACKGROUND

This disclosure relates to integrated circuits and semiconductor device fabrication and, more specifically, to circuits that include resistive memory elements and methods of using such circuits to generate a physical unclonable function.

A physical unclonable function (PUF) is a physical object that, for a given input and set of conditions, can generate a physically-defined digital fingerprint that serves as a unique identifier for an integrated circuit, such as a microprocessor. When a physical challenge is applied to the physical object, the physical object reacts in an unpredictable way due to the complex interaction between the stimulus and the physical object to generate an unpredictable response. The response can be used to generate a unique digital fingerprint embodied in the physical object.

A physical unclonable function may be generated based on physical variations that inherently occur during semiconductor manufacturing, and that permit differentiation between otherwise nominally identical semiconductor devices. For example, a physical unclonable function may be dependent on the uniqueness of the physical microstructure of the particular semiconductor devices. Consequently, random values embodied in a physical unclonable function may be impossible to duplicate or clone.

Improved circuits that include resistive memory elements and methods of using such circuits to generate a physical unclonable function are needed.

SUMMARY

According to an embodiment of the invention, a circuit includes a first resistive memory element, a second resistive memory element, a first transistor having a source/drain region connected to the first resistive memory element, and a second transistor having a source/drain region connected to the second resistive memory element. The circuit further includes a first inverter having an input connected to a first node between the first transistor and the first resistive memory element, and a second inverter having an input connected to a second node between the second transistor and the second resistive memory element.

According to another embodiment of the invention, a method includes directing a current in parallel to a first resistive memory element and a second resistive memory element, detecting a change of either the first resistive memory element or the second resistive memory element from a high-resistance state to a low-resistance state, and discontinuing the current in response to detecting the change.

BRIEF DESCRIPTION OF THE DRAWINGS

The accompanying drawings, which are incorporated in and constitute a part of this specification, illustrate various embodiments of the invention and, together with a general description of the invention given above and the detailed description of the embodiments given below, serve to explain the embodiments of the invention. In the drawings, like reference numerals refer to like features in the various views.

DETAILED DESCRIPTION

Figure 1:
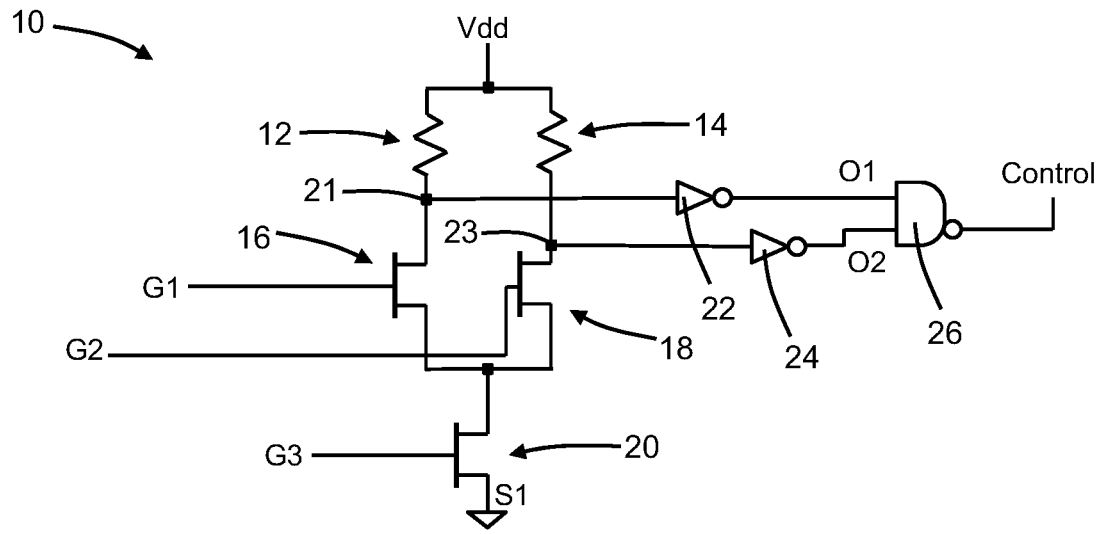
FIG. 1 is a circuit diagram of a cell configured to generate a random value of a physical unclonable function in accordance with embodiments of the invention.

With reference to FIG. 1 and in accordance with embodiments of the invention, a circuit for a cell 10 includes a resistive memory element 12, a resistive memory element 14, a field-effect transistor 16, a field-effect transistor 18, a field-effect transistor 20, an inverter 22, an inverter 24, and a NAND gate 26. The resistive memory element 12 and field-effect transistor 16 provide a 1R-1T bitcell, and the resistive memory element 14 and field-effect transistor 18 provide a separate 1R-1T bitcell. Each of the resistive memory elements 12, 14 includes a bottom electrode, a top electrode, and a switching layer that is positioned between the bottom electrode and the top electrode. The top electrode of each of the resistive memory elements 12, 14 is connected to a supply voltage Vdd. The resistive memory element 12 and field-effect transistor 16 are electrically in parallel with the resistive memory element 14 and field-effect transistor 18 such that, when initially biased during programming, the potential drop across the resistive memory element 12 and field-effect transistor 16 is equal to the potential drop across the resistive memory element 14 and field-effect transistor 18.

Each of the resistive memory elements 12, 14 is capable of being programmed by changing the electrical resistance across the switching layer from a high-resistance state to a low-resistance state. The low-resistance state of the resistive memory element 12 can be set by applying a programming voltage from the field-effect transistor 16 sufficient to create one or more conductive filaments bridging across the thickness of its switching layer between its bottom and top electrodes. The low-resistance state of the resistive memory element 14 can be set by applying a programming voltage from the field-effect transistor 18 sufficient to create one or more conductive filaments bridging across the thickness of its switching layer between its bottom and top electrodes. During programming, the conductive filaments may be formed, for example, by the diffusion of a conductive species (e.g., metal ions) from one or both of the bottom and top electrodes into the switching layer.

The resistive memory elements 12, 14 can be individually selected through the switching of the field-effect transistors 16, 18. The gate of the field-effect transistor 16 is connected with programming control circuitry 28 (FIG. 2), which is configured to supply a gate control signal G1 to the gate of the field-effect transistor 16. The gate of the field-effect transistor 18 is connected with the programming control circuitry 28, which is configured to supply a gate control signal G2 to the gate of the field-effect transistor 18. The field-effect transistor 16 has a source/drain region (e.g., a drain) connected to the bottom electrode of the resistive memory element 12, and the field-effect transistor 18 has a source/drain region (e.g., a drain) connected in a current path to the bottom electrode of the resistive memory element 14. As used herein, the term "source/drain region" means a doped region of semiconductor material that can function as either a source or a drain of a field-effect transistor. In an embodiment, the field-effect transistors 16, 18 may be p-channel transistors. In an alternative embodiment, the field-effect transistors 16, 18 may be n-channel transistors.

The gate of the field-effect transistor 20 is connected with the programming control circuitry 28 (FIG. 2), which is configured to supply a gate control signal G3 to the gate of the field-effect transistor 20. One of the source/drain regions of the field-effect transistor 20 is connected by a path Si to ground, and the other of the source/drain regions of the field-effect transistor 20 is connected in parallel to source/drain regions of the field-effect transistors 16, 18. In an embodiment, the field-effect transistor 20 may be a p-channel transistor.

The field-effect transistor 20, inverter 22, inverter 24, and NAND gate 26 are components of a detection circuit that, in conjunction with the programming control circuitry 28 (FIG. 2), is configured to detect a significant change in the voltage across either the resistive memory element 12 or the resistive memory element 14, and to switch off the voltage stress across the resistive memory elements 12, 14 in response to detecting a voltage change. The detection circuitry permits the states of the resistive memory elements 12, 14 to be preserved at a point in time during programming.

The inverter 22 has an input connected to a node 21 in the current path between the field-effect transistor 16 and the resistive memory element 12, and the inverter 24 has an input connected to a node 23 in the current path between the field-effect transistor 18 and the resistive memory element 14. The inverter 22 is configured to detect a voltage collapse across the resistive memory element 12 indicative of a change of the resistive memory element 12 from a high-resistance state to a low-resistance state and to change state in response to the resistance state change. The inverter 24 is configured to detect a voltage collapse across the resistive memory element 14 indicative of a change of the resistive memory element 14 from a high-resistance state to a low-resistance state and to change state in response to the resistance state change.

The inverters 22, 24 have outputs that are respectively coupled to different inputs of the NAND gate 26. The NAND gate 26 is configured to output a LOW (logical 0) output only if both inputs from the inverters 22, 24 to the NAND gate 26 are HIGH (logical 1). If either input is LOW, the NAND gate 26 is configured to output a HIGH output. The output from the NAND gate 26 may be provided to the programming control circuitry 28 (FIG. 2) used to generate and supply the gate control signals G1, G2, G3.

In use, the gate control signals G1, G2 supplied to the gates of the field-effect transistors 16, 18 may be set to HIGH such that the field-effect transistors 16, 18 are turned on, and the gate control signal G3 to the gate of the field-effect transistor 20 may be set to HIGH such that the field-effect transistor 20 is turned on and the nodes for the resistive memory elements 12, 14 are pulled down, which directs a programming current to flow in parallel through the resistive memory elements 12, 14. The voltage drop across the field-effect transistors 16, 18 may be negligible, or the voltages across the field-effect transistors 16, 18 may be sufficiently matched, such that the resistive memory elements 12, 14 are initially exposed to the same potential across them. Because a voltage is concurrently presented across both of the resistive memory elements 12, 14, each proceeds on an independent individual trajectory or path toward forming a low-resistance state. The forming or programming process is stochastic with a finite probability that the resistive memory element 12 will be formed or programmed before the resistive memory element 14 and, conversely, a finite probability that the resistive memory element 14 will be formed or programmed before the resistive memory element 12.

For example, if the resistive memory element 12 is programmed first, the resistive memory element 12 will transition to a low-impedance value defining a low-resistance path through which a comparatively high current can flow, which in turn means that the voltage across the resistive memory element 12 will collapse because the field-effect transistors 16, 18 have a negligible voltage drop across them. The voltage across resistive memory element 12 will pull up high, which pulls up the voltage on the resistive memory element 14 and thereby significantly reduces the probability that the resistive memory element 14 will be programmed.

In response to the voltage across the resistive memory element 12 collapsing before the voltage collapses across the resistive memory element 14, the inverter 22 detects the collapse reflecting the programming of the resistive memory element 12 and changes its state, which then triggers an output signal O1. Conversely, in response to the voltage across the resistive memory element 14 collapsing before the voltage collapses across the resistive memory element 12, the inverter 24 detects the collapse reflecting the programming of the resistive memory element 14 and changes its state, which then triggers an output signal O2. The output signal O1 or the output signal O2 may be provided through the NAND gate 26 to the programming control circuitry 28 (FIG. 2) for use in discontinuing the programming current to the resistive memory elements 12, 14 in response to detecting a change of either the first resistive memory element or the second resistive memory element from the high-resistance state to the low-resistance state. Based on the voltage feedback embodied in the output signal O1 or the output signal O2, the programming current may be discontinued by modifying the gate control signals G1, G2, G3 supplied to the gates of the field-effect transistor 16, 18, 20. For example, the programming control circuitry 28 may turn off the field-effect transistor 20 by, for example, setting the gate control signal G3 to LOW upon receipt of either the output signal O1 or the output signal O2. The disparity in the resistance states between the resistive memory element 12 and the resistive memory element 14 is thereby preserved.

Discontinuing the programming current based on the receipt of the output signals O1, O2 attempts to ensure that only one or the other of the resistive memory elements 12, 14 is permitted to change to the low-resistance state. In the unlikely event that the inverters 22, 24 change state either simultaneously or almost simultaneously, then the resultant indeterminate bit can be discarded. Alternatively, in this instance, a higher-resolution detector, as subsequently described, may be used to attempt to determine which of the resistive memory elements 12, 14 possesses the lower impedance (i.e., the lower resistance) and to avoid discarding the bit if the higher-resolution determination is successful.

The programmed one of the resistive memory elements 12, 14 can be identified and selected by the programming control circuitry 28 (FIG. 2) and additional processing may be performed to ensure that the programming has occurred in a robust fashion. In that regard, the different resistance states of the resistive memory elements 12, 14 may be read or interrogated by passing a read current using the field-effect transistor 16, 18, 20 through the resistive memory elements 12, 14 and measuring a voltage difference between the resistive memory element 12 and the resistive memory element 14. The read current is limited to avoid altering the respective resistance states of the resistive memory elements 12, 14 during interrogation. In that regard, the read current is significantly less than the programming current. The one of the resistive memory elements 12, 14 that programmed under the voltage stress may be identified based on the voltage difference that is measured. Specifically, the resistive memory element 12 will exhibit a lower voltage drop if first programmed to its low-resistance state resulting in the voltage collapse, and the resistive memory element 14 will exhibit a lower voltage drop if first programmed to its low-resistance state resulting in the voltage collapse.

In an embodiment, a hardening enhancement operation may then be initiated and performed by the programming control circuitry 28 (FIG. 2) based on the identification of the programmed one of the resistive memory elements 12, 14 to enhance the robustness of its low-resistance state. The programmed one of the resistive memory elements 12, 14 (e.g., resistive memory element 12) may be driven harder by applying additional current to ensure that the forming process is completed, whereas the unprogrammed one of the resistive memory elements 12, 14 (e.g., resistive memory element 14) can be isolated from the additional current. For example, the programming control circuitry 28 can turn on the field-effect transistor 16 and the field-effect transistor 20 to supply additional current to the resistive memory element 12, while the field-effect transistor 18 is turned off to isolate the resistive memory element 14. In an embodiment, the programming control circuitry 28 may implement the hardening enhancement operation using the field-effect transistors 16, 18, 20 and without off-chip data transfer, which promotes data security.

In an embodiment, the pair of resistive memory elements 12, 14 in the cell contain data that may be considered to constitute a single random bit or value of a physical unclonable function. For example, the random value may be considered to be a logical 1 if the resistive memory element 12 is programmed by the stochastic forming process to a low-resistance state or may be considered to be a logical 0 if resistive memory element 14 is programmed by the stochastic forming process to a low-resistance state. Only one of the resistive memory elements 12, 14 is programmed to the low-resistance state, whereas the other of the resistive memory elements 12, 14 is limited to a high-resistance state, which creates the binary condition. The random value of the physical unclonable function can be read by passing a read current using the field-effect transistor 16, 18, 20 through the resistive memory elements 12, 14 that does not modify the respective resistances and measuring a voltage difference between the resistive memory element 12 and the resistive memory elements 14. In that regard, the read current is significantly less than the programming current used to generate the random value of the physical unclonable function.

In an alternative embodiment, following the hardening enhancement operation, the programming control circuitry 28 (FIG. 2) may write the state of the pair of resistive memory elements 12, 14 to a resistive memory element of a bitcell in a memory array 30, on the same chip 50, as a single random bit or value of a physical unclonable function. The resistive memory elements of the memory array 30 may be pristine and may not have been subjected to any prior voltage stress. The random value written to the resistive memory element of the bitcell in the memory array 30 may be, for example, a logical 1 if the resistive memory element 12 is programmed by the stochastic forming process to a low-resistance state or a logic 0 if resistive memory element 14 is programmed by the stochastic forming process to a low-resistance state. In this manner, binary data generated by the controlled programming and reinforcement of the pair of resistive memory elements 12, 14 may be transferred or written to the resistive memory element of one of the bitcells in the memory array 30 on the chip and captured as a single random bit or value of a physical unclonable function. Following the transfer of the random value to the bitcell of the memory array 30, the cells including the resistive memory elements 12, 14 may be disregarded in terms of their programmed or unprogrammed state. The memory array 30 operates as a shadow memory after the stochastic forming of the resistive memory elements 12, 14 has been completed, and the random value of the physical unclonable function can be read from the bitcell of the memory array 30 instead of being read from the pair of resistive memory elements 12, 14.

The cell 10 may be used to generate a single random value of a physical unclonable function by a fast, self-limiting, and self-reinforcing stochastic forming method. The cell 10 provides the random value of the physical unclonable function with reliance upon the inherent forming-voltage stochasticity of resistive memory elements, but the derived random value does not depend on logic to assess and react. The cell 10 may promote highly-efficient random bit generation with a low bit error rate for a physical unclonable function.

Figure 2:
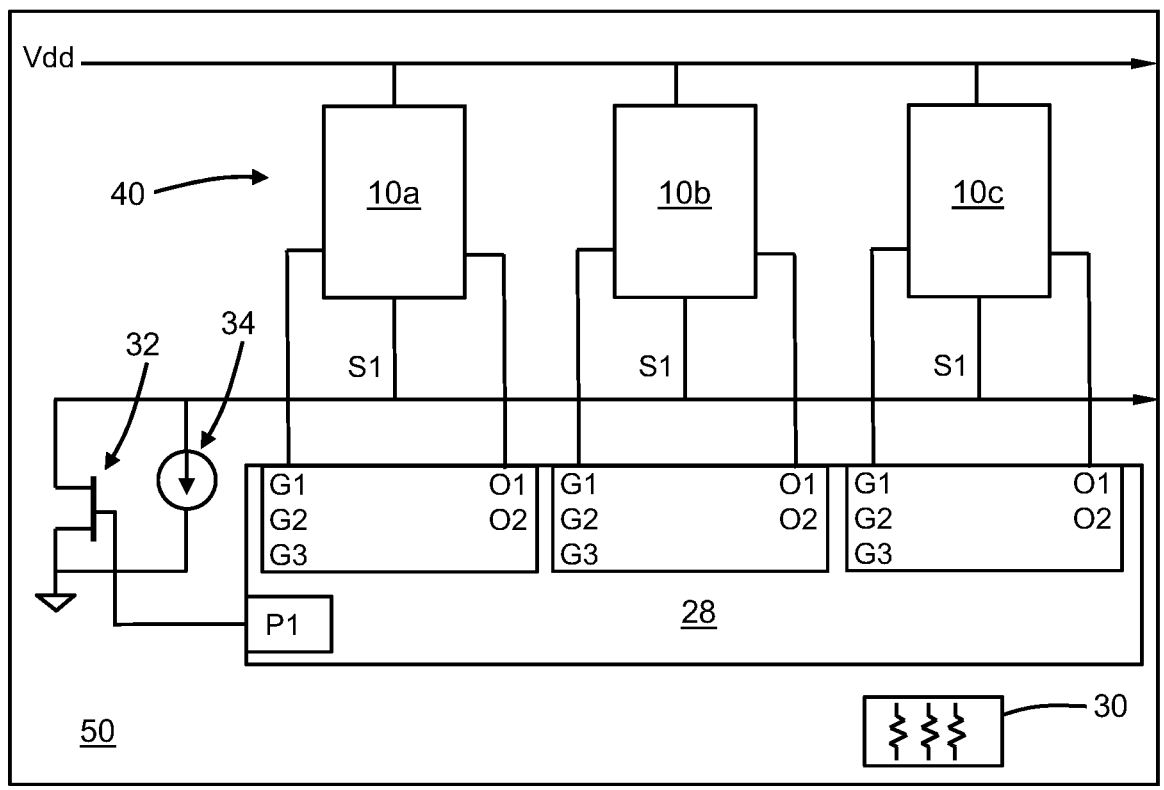
FIG. 2 is a circuit diagram of cells and a control block configured to generate multiple random values of a physical unclonable function in accordance with embodiments of the invention.

With reference to FIGS. 1, 2 and in accordance with embodiments of the invention, multiple instances of the cell 10 may be connected together as cells 10a, 10b, 10c to form an array 40. The cells 10a, 10b, 10c may be connected to programming control circuitry 28 that is configured to select and control the functioning of the cells 10a, 10b, 10c and thereby generate multiple random bits or values of a physical unclonable function. The number of cells in the array 40 may be increased to provide a corresponding number of random values that collectively compose the physical unclonable function.

The programming control circuitry 28 includes control logic for implementing a process control block to generate random values that are used to establish the physical unclonable function. In that regard, the programming control circuitry 28 is configured to individually select the cells 10a, 10b, 10c one at a time and supply gate control signals G1, G2, G3 over connections to the gates of the field-effect transistors 16, 18, 20 in the selected cell thereby causing a programming current to flow through the pair of resistive memory elements 12, 14 of only the selected cell. In that regard, the programming control circuitry 28 may be configured with independent connections to the gates of the field-effect transistors 16, 18, 20 in the different cells 10a, 10b, 10c that permit independent control over the different field-effect transistors 16, 18, 20. A transistor 32 may be controlled by the control block to connect a source/drain region of the field-effect transistor 20 in each of the different cells 10a, 10b, 10c to ground via a common path 51. Similarly, the top electrodes of the resistive memory elements 12, 14 in each of the different cells 10a, 10b, 10c may be connected to a bus providing a common supply voltage Vdd. A constant current source 34 may be used by the programming control circuitry 28 to perform the programming of the resistive memory elements 12, 14 in each of the different cells 10a, 10b, 10c. The current supplied from the constant current source 34 is high enough to initiate the forming process but low enough such that, when one of the resistive memory elements 12, 14 transitions to the low-resistance state, the voltage across the resistive memory elements 12, 14 drops substantially enough to prevent the other of the resistive memory elements 12, 14 from transitioning to the low-resistance state.

The programming control circuitry 28 is configured with connections to the different cells 10a, 10b, 10c to receive the output signals O1, O2. The programming control circuitry 28 monitors for an output signal O1 from the detector defined by the inverter 22 of the selected cell for an indication of the occurrence of a significant decrease in the resistance of the resistive memory element 12 signifying its programming. The programming control circuitry 28 concurrently monitors for an output signal O2 from the detector defined by the inverter 24 of the selected cell for an indication of the occurrence of a significant decrease in the resistance of the resistive memory element 14 signifying its programming. The programming control circuitry 28 can identify which of the resistive memory elements 12, 14 has been programmed to its low-resistance state based on the output signals O1, O2. The programming control circuitry 28 may then perform a hardening enhancement operation, as previously described, to reinforce the low-resistance state of the programmed resistive memory element 12 of the selected cell or, alternatively, to reinforce the low-resistance state of the programmed resistive memory element 14 of the selected cell.

After all of the cells 10a, 10b, 10c have been selected and subjected to the controlled voltage stress and optional hardening enhancement operation, the cells 10a, 10b, 10c may be subsequently read to provide random values of the physical unclonable function. Alternatively, the programming control circuitry 28 may write the state of the pair of resistive memory elements 12, 14 in each of the cells 10a, 10b, 10c to the resistive memory element of one of the bitcells in the memory array 30, on the same chip 50, and multiple random values of the physical unclonable function may be later read from the memory array 30.

The programming control circuitry 28 may exert individual control over the forming or programming of the resistive memory elements 12, 14 in each of the cells 10a, 10b, 10c. The programming control circuitry 28 can independently initiate the programming of each pair of resistive memory elements 12, 14 and, based receive feedback from each of the cells 10a, 10b, 10c, halt programming such that, optimally, only one of the resistive memory elements 12, 14 forms to a low-resistance state. The differential resistance states of each pair of differentially-programmed resistive memory elements 12, 14 may be translated to one of the random values of the physical unclonable function.

Figure 3:
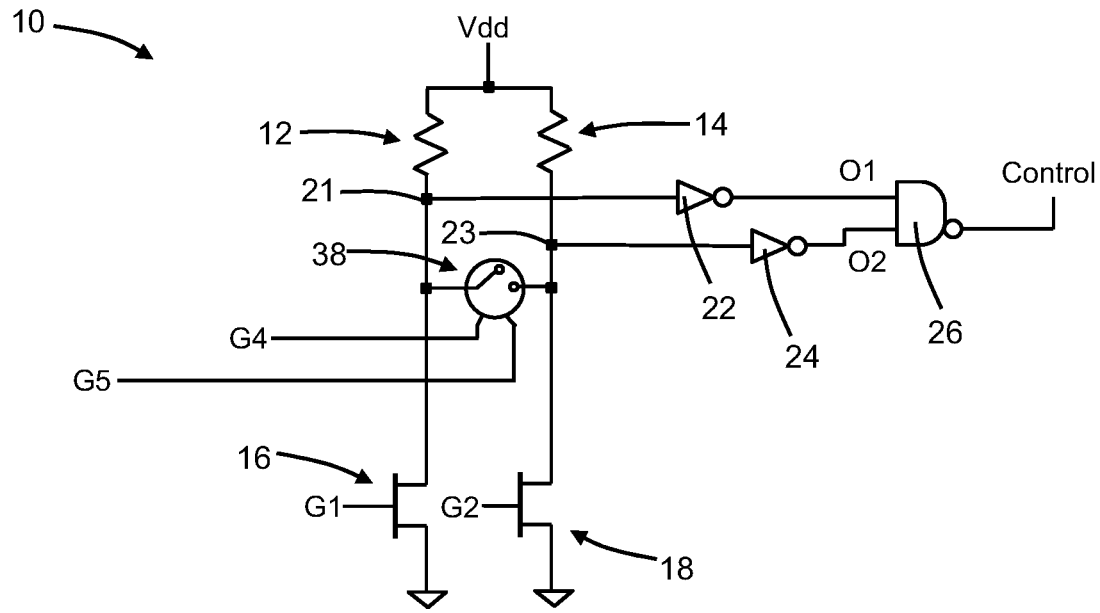
FIG. 3 is a circuit diagram of a cell configured to generate a random value of a physical unclonable function in accordance with alternative embodiments of the invention.

With reference to FIG. 3 and in accordance with alternative embodiments of the invention, the cell 10 may be modified to directly connect one of the source/drain regions of each of the field-effect transistors 16, 18 to ground, thereby eliminating the field-effect transistor 20 from the cell 10, and to add a switch 38 that is controlled by inputs G4, G5 from the programming control circuitry 28 (FIG. 2). Using inputs G4, G5 for state control, the ends of the resistive memory elements 12, 14 are shorted together when the switch 38 is in one state, and the ends of the resistive memory elements 12, 14 are disconnected when the switch 38 is in its other state. The switch 38 may be, for example, a field-effect transistor. The utilization of the switch 38 permits the gate control signals G1, G2 to the gates of the field-effect transistors 16, 18 to be independently turned on and off.

Figure 4:
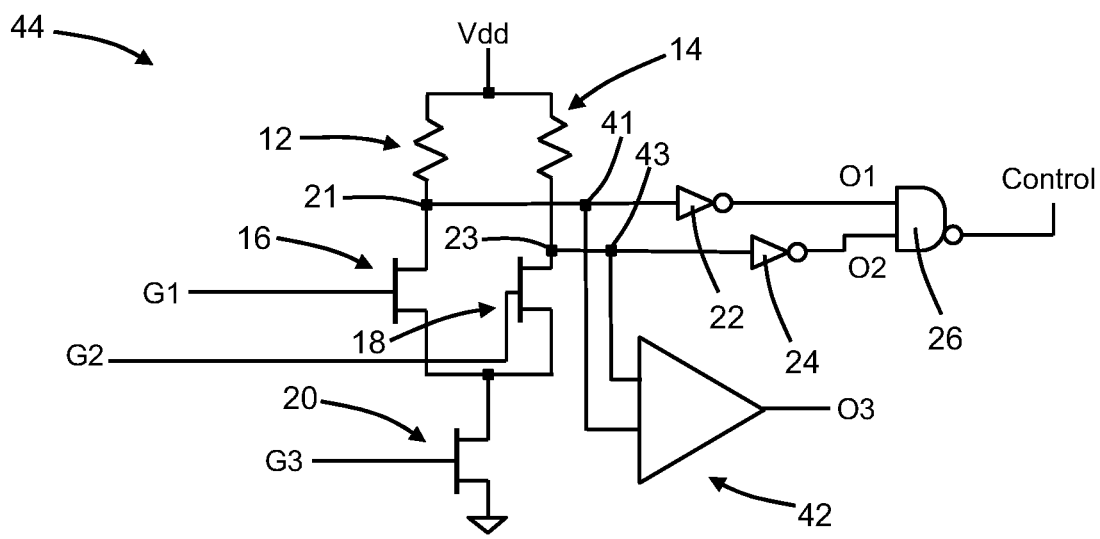
FIG. 4 is a circuit diagram of a cell configured to generate a random value of a physical unclonable function in accordance with alternative embodiments of the invention.

With reference to FIG. 4 and in accordance with alternative embodiments of the invention, a cell 44 may formed by modifying the cell 10 to introduce a comparator 42. The comparator 42 has an input connected to a node 41 in the current path between the resistive memory element 12 and the inverter 22, and the comparator 42 has another input connected to a node 43 in the current path between the resistive memory element 14 and the inverter 24. The function of the comparator 42 is to monitor the node 41 and the node 43 for an indication that one of the nodes 41, 43 has a higher voltage than the other of the nodes 41, 43, and to output a digital signal indicating which of the nodes 41, 43 has the higher voltage. For example, if the resistive memory element 12 forms to the low-resistance state and the resistive memory element 14 is not formed, then a current path exists through the field-effect transistor 20 and the node 41 will be higher than the node 43. The introduction of the comparator 42 provides a higher resolution approach to determining the relative resistance values of the resistive memory elements 12, 14. For example, if both of the inverters 22, 24 were to indicate a change to a low-resistance state, the comparator 42 may be able to discriminate which of the resistive memory elements 12, 14 has the lower resistance and higher voltage drop.

In an embodiment, the programming control circuitry 28 (FIG. 5) can perform a check to ensure that the difference in node voltage between the resistive memory elements 12, 14 is substantially higher than the offset of the comparator 42. The checking operation may be performed by switching the inputs to the comparator 42. If, before the switching, the output of the comparator 42 is a logical 0 and, after the switching, the output of the comparator 42 flips to a logical 1, then the offset of the comparator 42 is considered to be negligible in comparison to the voltage difference between the resistive memory elements 12, 14. In contrast, if the output of the comparator 42 does not flip when the inputs are switched, then the voltage difference between the resistive memory elements 12, 14 is not significant enough to constitute a robust detection, and the programming control circuitry 28 can decide to either discard the result of cell programming or to continue with the forming process.

Figure 5:
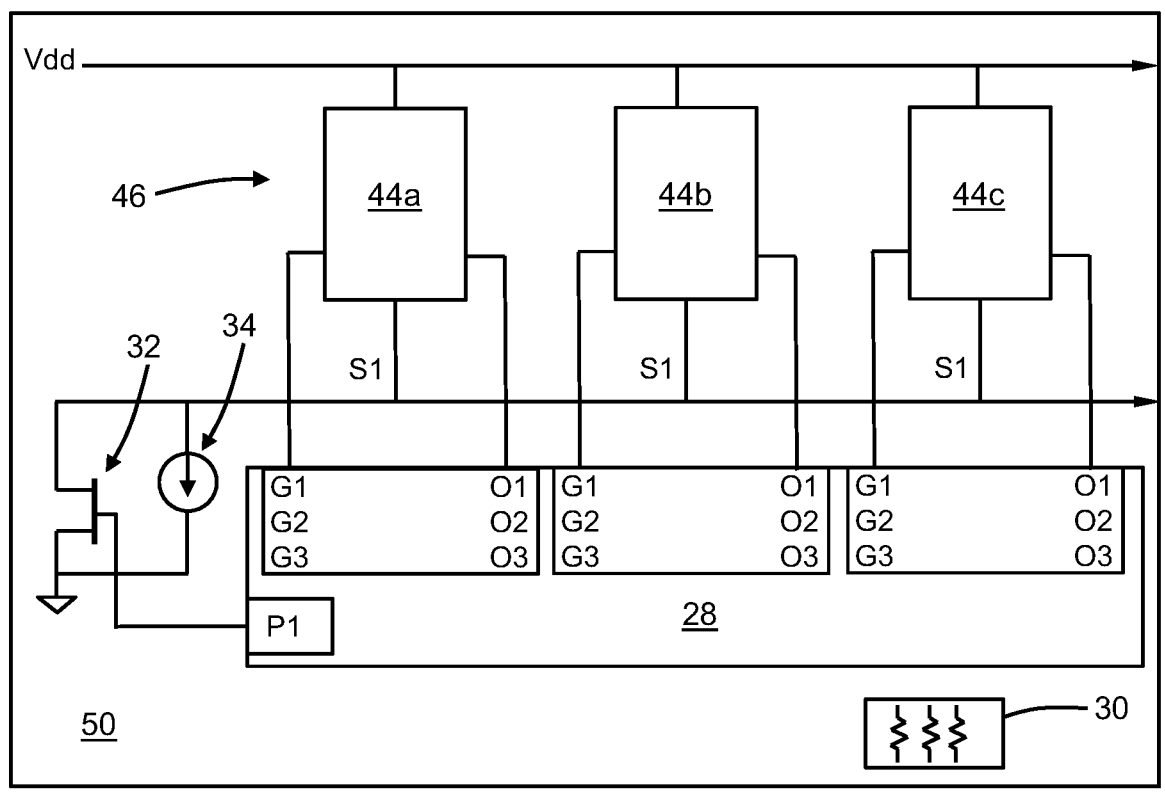
FIG. 5 is a circuit diagram of cells and a control block configured to generate multiple random values of a physical unclonable function in accordance with alternative embodiments of the invention.

With reference to FIGS. 4, 5 and in accordance with embodiments of the invention, multiple instances of the cell 44 may be connected together as cells 44a, 44b, 44c to form an array 46. Similar to the array 40 (FIG. 2), the cells 44a, 44b, 44c are connected to the programming control circuitry 28, which is configured to select and control the functioning of the cells 44a, 44b, 44c to thereby generate multiple random bits or values of a physical unclonable function. The construction and operation of the array 46 is similar to that described for array 40, other than the additional output O3 from the comparator 42 that is received by the programming control circuitry 28 from each of the cells 44a, 44b, 44c and used as previously described.

The methods as described above are used in the fabrication of integrated circuit chips. The resulting integrated circuit chips can be distributed by the fabricator in raw wafer form (e.g., as a single wafer that has multiple unpackaged chips), as a bare die, or in a packaged form. The chip may be integrated with other chips, discrete circuit elements, and/or other signal processing devices as part of either an intermediate product or an end product. The end product can be any product that includes integrated circuit chips, such as computer products having a central processor or smartphones.

References herein to terms modified by language of approximation, such as "about", "approximately", and "substantially", are not to be limited to the precise value specified. The language of approximation may correspond to the precision of an instrument used to measure the value and, unless otherwise dependent on the precision of the instrument, may indicate a range of +/−10% of the stated value(s).

References herein to terms such as "vertical", "horizontal", etc. are made by way of example, and not by way of limitation, to establish a frame of reference. The term "horizontal" as used herein is defined as a plane parallel to a conventional plane of a semiconductor substrate, regardless of its actual three-dimensional spatial orientation. The terms "vertical" and "normal" refer to a direction perpendicular to the horizontal, as just defined. The term "lateral" refers to a direction within the horizontal plane.

A feature "connected" or "coupled" to or with another feature may be directly connected or coupled to or with the other feature or, instead, one or more intervening features may be present. A feature may be "directly connected" or "directly coupled" to or with another feature if intervening features are absent. A feature may be "indirectly connected" or "indirectly coupled" to or with another feature if at least one intervening feature is present. A feature "on" or "contacting" another feature may be directly on or in direct contact with the other feature or, instead, one or more intervening features may be present. A feature may be "directly on" or in "direct contact" with another feature if intervening features are absent. A feature may be "indirectly on" or in "indirect contact" with another feature if at least one intervening feature is present. Different features may "overlap" if a feature extends over, and covers a part of, another feature.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A circuit comprising:
a first resistive memory element;
a second resistive memory element;
a first transistor having a first source/drain region connected to the first resistive memory element;
a second transistor having a first source/drain region connected to the second resistive memory element;
a first inverter having an input connected to a first node between the first transistor and the first resistive memory element;
a second inverter having an input connected to a second node between the second transistor and the second resistive memory element; and
a comparator having a first input and a second input, the first input connected to a third node between the first resistive memory element and the first inverter, and the second input connected to a fourth node between the second resistive memory element and the second inverter.

2. The circuit of claim 1 wherein the first transistor has a second source/drain region, the second transistor has a second source/drain region, and further comprising:
a third transistor having a source/drain region connected to the second source/drain region of the first transistor and the second source/drain region of the second transistor.

3. A circuit comprising:
a first resistive memory element;
a second resistive memory element;
a first transistor including a first source/drain region and a first gate, the first source/drain region of the first transistor connected to the first resistive memory element;
a second transistor including a first source/drain region and a second gate, the first source/drain region of the second transistor connected to the second resistive memory element;
a first inverter having an input connected to a first node between the first transistor and the first resistive memory element;
a second inverter having an input connected to a second node between the second transistor and the second resistive memory element; and
programming control circuitry connected to the first gate of the first transistor and the second gate of the second transistor.

4. The circuit of claim 3 wherein the programming control circuitry is configured to turn on the first transistor and to turn on the second transistor.

5. The circuit of claim 4 wherein the first transistor has a second source/drain region, the second transistor has a second source/drain region, and further comprising:
a third transistor having a gate connected to the programming control circuitry and a source/drain region connected to the second source/drain region of the first transistor and the second source/drain region of the second transistor,
wherein the programming control circuitry is configured to turn on the third transistor.

6. The circuit of claim 5 wherein the programming control circuitry is configured to receive a first output signal from the first inverter, the programming control circuitry is configured to receive a second output signal from the second inverter, and the programming control circuitry is configured to turn off the third transistor in response to the first output signal or the second output signal.

7. The circuit of claim 3 wherein the programming control circuitry is configured to receive a first output signal from the first inverter, and the programming control circuitry is configured to receive a second output signal from the second inverter.

8. The circuit of claim 3 further comprising:
a comparator having a first input and a second input, the first input connected to a third node between the first resistive memory element and the first inverter, the second input connected to a fourth node between the second resistive memory element and the second inverter, and the programming control circuitry configured to receive an output signal from the comparator.

9. The circuit of claim 1 further comprising:
a switch having a first position in which the first resistive memory element is shorted to the second resistive memory element and a second position in which the first resistive memory element is disconnected from the second resistive memory element.

10. A method comprising:
directing a first current in parallel to a first resistive memory element and a second resistive memory element;
detecting a change of either the first resistive memory element or the second resistive memory element from a high-resistance state to a low-resistance state; and
discontinuing the first current in response to detecting the change of either the first resistive memory element or the second resistive memory element from the high-resistance state to the low-resistance state.

11. The method of claim 10 further comprising:
directing a second current through the first resistive memory element and the second resistive memory element; and
measuring a voltage difference between the first resistive memory element and the second resistive memory element while directing the second current through the first resistive memory element and the second resistive memory element,
wherein the second current is less than the first current.

12. The method of claim 11 wherein the first resistive memory element has the low-resistance state based on the measured voltage difference, and the low-resistance state of the first resistive memory element specifies a random value of a physical unclonable function.

13. The method of claim 12 further comprising:
transferring the random value of the physical unclonable function to a third resistive memory element of a bitcell in a memory array.

14. The method of claim 13 further comprising:
reading the random value of the physical unclonable function from the bitcell of the memory array.

15. The method of claim 12 further comprising:
reading the random value of the physical unclonable function based on the voltage difference between the first resistive memory element and the second resistive memory element.

16. The method of claim 12 further comprising:
applying a third current to the first resistive memory element in response to discontinuing the first current; and
isolating the second resistive memory element from the third current.

17. The method of claim 10 wherein detecting the change of either the first resistive memory element or the second resistive memory element from the high-resistance state to the low-resistance state comprises:
outputting an output signal from an inverter connected to a node between the first resistive memory element and a first transistor,
wherein the output signal indicates that the first resistive memory element changed from the high-resistance state to the low-resistance state.

18. The method of claim 10 wherein the first current is directed in parallel to the first resistive memory element and the second resistive memory element with equal voltages across the first resistive memory element and the second resistive memory element.

19. The method of claim 10 wherein detecting the change of either the first resistive memory element or the second resistive memory element from the high-resistance state to the low-resistance state comprises:
comparing, by a comparator, a first voltage drop across the first resistive memory element to a second voltage drop across the second resistive memory element; and
determining that the first resistive memory element has the low-resistance state based on an output from the comparator,
wherein the low-resistance state of the first resistive memory element determines a random value of a physical unclonable function.

20. The circuit of claim 3 further comprising:
a comparator having a first input and a second input, the first input connected to a third node between the first resistive memory element and the first inverter, and the second input connected to a fourth node between the second resistive memory element and the second inverter.

* * * * *